United States Patent
Schulz

(10) Patent No.: US 10,458,556 B2
(45) Date of Patent: Oct. 29, 2019

(54) VALVE DEVICE

(71) Applicant: HYDAC FLUIDTECHNIK GMBH, Sulzbach/Saar (DE)

(72) Inventor: Frank Schulz, Blieskastel-Bierbach (DE)

(73) Assignee: HYDAC FLUIDTECHNIK GMBH, Sulzbach/Saar (DE)

(*) Notice: Subject to any disclaimer, the term of this patent is extended or adjusted under 35 U.S.C. 154(b) by 128 days.

(21) Appl. No.: 15/540,280

(22) PCT Filed: Dec. 10, 2015

(86) PCT No.: PCT/EP2015/002493
§ 371 (c)(1),
(2) Date: Jun. 28, 2017

(87) PCT Pub. No.: WO2016/107669
PCT Pub. Date: Jul. 7, 2016

(65) Prior Publication Data
US 2017/0356554 A1    Dec. 14, 2017

(30) Foreign Application Priority Data
Dec. 30, 2014 (DE) .......... 10 2014 019 615

(51) Int. Cl.
*F16K 11/07* (2006.01)
*F16K 31/06* (2006.01)

(52) U.S. Cl.
CPC ...... *F16K 11/0716* (2013.01); *F16K 31/0613* (2013.01); *Y10T 137/8671* (2015.04); *Y10T 137/86702* (2015.04)

(58) Field of Classification Search
CPC .. F16K 11/07; F16K 11/0716; F16K 31/0613; Y10T 137/86614; Y10T 137/86702; Y10T 137/8671

(Continued)

(56) References Cited

U.S. PATENT DOCUMENTS 3,186,424 A * 6/1965 Peach ............... F15B 13/04
                                              137/115.04
5,284,220 A    2/1994 Shimizu et al.
(Continued)

FOREIGN PATENT DOCUMENTS

DE        102 24 739      8/2003
DE    10 2010 005 229     7/2011
(Continued)

OTHER PUBLICATIONS

International Search Report (ISR) dated Apr. 11, 2016 in International (PCT) Application No. PCT/EP2015/002493.

*Primary Examiner* — Kevin F Murphy
*Assistant Examiner* — Kelsey E Cary
(74) *Attorney, Agent, or Firm* — Wenderoth, Lind & Ponack, L.L.P.

(57) ABSTRACT

A valve device has a valve housing and a main piston (4) arranged in an axially slidable manner in a piston bore of the valve housing (2). A first consumer connection (A) and a second consumer connection (B) can be alternately connected to a pressure connection (P) and a tank connection (T1, T2) by the action of a first magnetic actuating system (6) and a second magnetic actuating system (8) with two pilot pistons (14, 16). In an actuated state of the respective pilot piston (14, 16), the main piston (4) follows the movement of the pilot piston (14, 16) due to the force ratio adjusting itself to actuate the fluid-carrying connection between the pilot chamber (10, 12) of the pilot piston (14,16) and the assignable tank connection (T1, T2) such that pilot oil flows.

9 Claims, 3 Drawing Sheets

(58) Field of Classification Search
USPC .......................... 137/625.64, 625.68, 625.69
See application file for complete search history.

(56) References Cited

U.S. PATENT DOCUMENTS

| | | | | |
|---|---|---|---|---|
| 5,778,932 | A | * | 7/1998 | Alexander ......... G05D 16/2013 |
| | | | | 137/625.65 |
| 2012/0247594 | A1 | * | 10/2012 | Inagaki ................... F15B 5/006 |
| | | | | 137/625.69 |
| 2012/0285568 | A1 | | 11/2012 | Schulz et al. |
| 2012/0292540 | A1 | | 11/2012 | Bruck et al. |

FOREIGN PATENT DOCUMENTS

| | | |
|---|---|---|
| EP | 0 432 606 | 6/1991 |
| WO | 2011/088974 | 7/2011 |
| WO | 2011/088975 | 7/2011 |

\* cited by examiner

VALVE DEVICE

FIELD OF THE INVENTION

The invention relates to a valve device having a valve housing and a main piston arranged in an axially displaceable manner in a piston bore of the valve housing. Via the main piston, a first consumer connection and a second consumer connection can be alternately connected to a pressure connection and to a tank connection by the action of a first magnet actuating system and a second magnet actuating system. The main piston can be displaced out of a centered, preferably central rest position in a first direction for the connection of the first consumer connection to the pressure connection, and of the second consumer connection to the tank connection and can be displaced in an opposite direction for the converse fluid-conducting connection of the connections. A first pilot control compartment is provided and applies a pressure to a first piston rear side of the main piston. A second pilot control compartment is provided and applies a pressure to a second piston rear side of the main piston. The first and the second pilot control compartments are connected via a fluid-conducting connection to the pressure connection. A first pilot control piston and a second pilot control piston are provided, each pilot control piston enabling or blocking a fluid-conducting connection between the pilot control compartments and the tank connection.

BACKGROUND OF THE INVENTION

Such a valve device is known from the document DE 10 2010 005 229 A1. In the known solution, any disruptive influence on the valve piston caused by friction forces or flow forces can be compensated for without control effort or regulating effort by increased discharge of pressurizing medium from the respective pilot control compartment. As a result, the main piston is further displaced towards the desired position.

If the electric current for one of the two electromagnets is reduced or switched off, the pilot control piston is preferably additionally moved by an energy storage device, commonly in the form of a compression spring, towards a position that blocks the fluid-conducting connection between the activated pilot control compartment and the assignable tank connection. The pressure that builds up again in the pilot control compartment then pushes the main piston back towards its rest position.

In the same manner as described above, the main piston can be axially displaced in the opposite direction when the additional second electromagnet is energized. In this way, the second consumer connection can be connected to the pressure connection and the first consumer connection can be connected to the tank connection. Although the known solution provides a valve device that permits functionally-reliable operation, even in the case of difficult operating conditions, the known solution is not entirely satisfactory with regards to improving performance and simultaneously reducing the valve design size.

SUMMARY OF THE INVENTION

Based on this state of the art, the invention thus addresses the problem of further improving the known solution, while retaining the advantages thereof, namely, ensuring a functionally-reliable operation. An improvement in the performance of the valve device is obtained with simultaneous reduction of its design size. Furthermore, the valve device can be cost-efficiently produced.

This problem is basically solved by a valve device having, in an actuated state of the respective pilot control piston, the main piston following the movement of this pilot control piston due to the degree of force applied to the main piston and thereby activating the fluid-conducting connection between the pilot control compartment of this pilot control piston and the assignable tank connection in such a way that pilot control oil flows. The pilot control is then realized, by comparison with the known solution, by using a pressure-compensated slide, which allows the valve device to be more simply constructed and more cost-efficiently produced. Due to this pressure compensation by the appropriate activation of the pilot control piston and the main piston, the division in terms of the fluid flow is improved, resulting in an increase in performance of the valve device. Due to the slide design, the fluid activation can be realized in a space-saving manner, so that the solution according to the invention can be correspondingly reduced in terms of design size compared with known solutions, while retaining the same capacity. The respective degree of force produced on the main (control) piston results from the pressure difference of the respective spring forces acting on the main piston. Furthermore, the activation always takes place in such a way that the respective pilot control orifice that is to this extent realized is not closed, so that pilot control oil can always flow during operation.

In one preferred embodiment of the valve device according to the invention, the respective fluid-conducting connection between the pilot control compartment of the respective pilot control piston and the assignable tank connection is formed by at least one pilot control orifice of the main piston. In the unactuated state of the pilot control piston and the main piston, that pilot control orifice is closed by the assignable pilot control piston. This construction likewise contributes to achieving an optimally space-saving design of the valve device according to the invention.

In one particularly preferred embodiment, at least one of the two pilot control pistons is guided with its outer circumference at least partially along the inner circumference of an assignable recess in the valve piston, into which recess the respective pilot control orifice opens. The pilot control piston formed as a slide piston can then be activated in a manner with low friction forces and movement forces by an actuating magnet system.

In another preferred embodiment, the respective pilot control piston has a projecting contact collar outside of the recess of the main piston, on which contact collar the main piston can rest with its respective assignable free end face in at least one of its displacement positions. Also, in the neutral position, the main piston is held in its unactuated neutral position by at least one main spring of the magnet actuating system and at least one resetting spring, which surrounds the pilot control piston. An activation of the pilot control piston and the main piston out of this neural position is then achieved in an energy-saving manner with little actuating force of the respective magnet actuating system.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale.

DETAILED DESCRIPTION OF THE INVENTION

Figure 1:
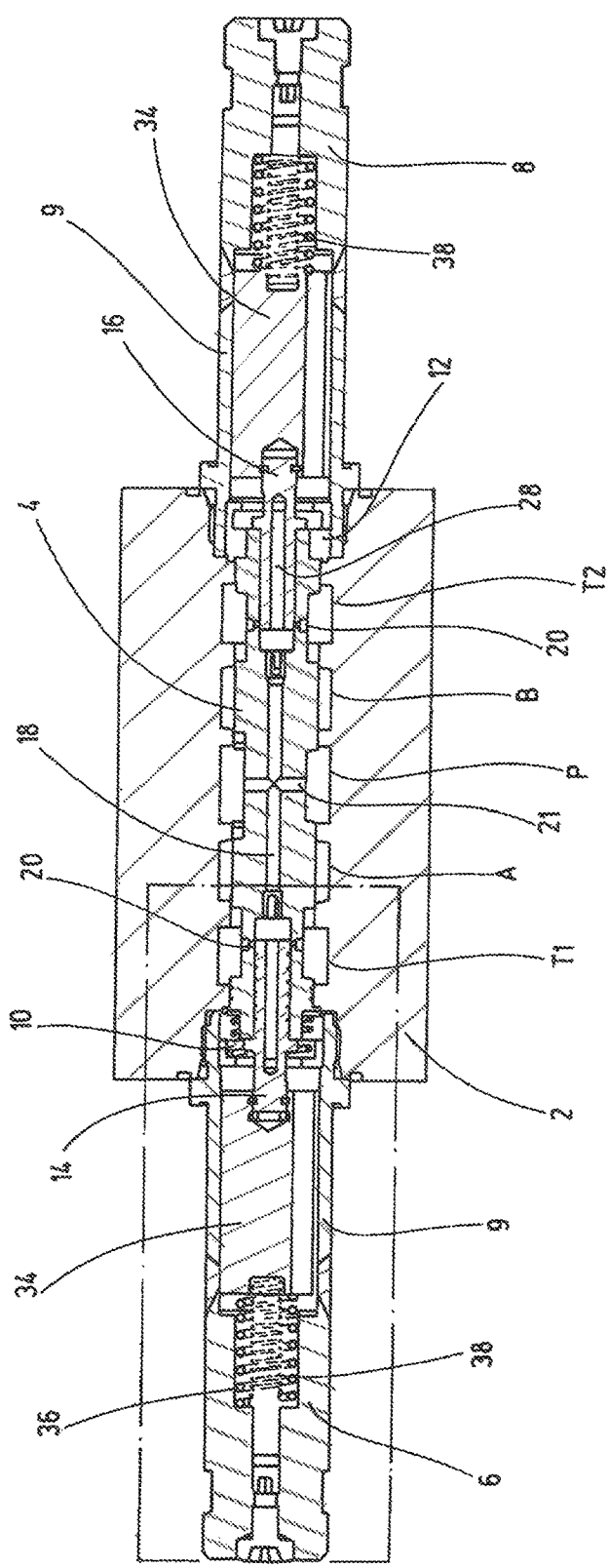
FIG. 1 is a schematic side view in section of a valve device according to an exemplary embodiment of the invention, wherein the two magnet actuating systems arranged at the ends are de-energized.

FIG. 1 depicts, in a schematic, not to scale longitudinal section, a valve device, according to an exemplary embodiment of the invention, for controlling the flow of pressurizing medium, such as hydraulic oil, to a consumer (not depicted in detail). For example, the consumer is in the form of a hydraulic working cylinder, which can be attached to the consumer connections A, B with its piston side and rod side and the two associated working spaces. The valve device has a valve housing 2, which is formed essentially block-shaped and in particular cylindrical. In addition, the valve housing 2 delimits towards the outside the fluid connection points A, B, P, T1, T2, which, in a conventional manner, open into annular channels inside the valve housing 2 and which can be activated by a main piston or a valve piston 4. The two tank connections T1, T2 are brought together at a common tank connection T, so that a fluid discharge both from the tank connection T1 and via the connection T2 takes place in the common connection T.

A through-hole is introduced into the valve housing 2, which hole is formed as a piston bore or cylinder bore for accommodating the main piston 4 and which hole ensures the longitudinal displaceability of main piston 4 inside the valve housing 2. For the indirect actuation of the main piston 4, first and second magnet actuating systems or actuators 6, 8 are arranged on both sides of the valve housing 2, which magnet actuating systems have a conventional design. The respective energizable operating coils for the magnet actuating systems 6, 8 have been omitted from the drawing for the sake of simpler representation. The magnet actuating systems 6, 8 together with their pole tube arrangements 9 can be fixed by screwing opposite one another on the free end faces of the valve housing 2.

The respective magnet actuating system 6, 8 is in particular formed as a proportional magnet. The main piston 4 depicted in FIG. 1 has radial projections on the outer circumference side, with the respective radial outer circumference of the respective projection being selected such that the main piston 4 can slide in a tight manner on the inner circumference side of the valve piston bore to allow the individual fluid connections to be separated from one another or alternatively connected to one another. A first pilot control compartment 10 and a second pilot control compartment 12 are connected to the two opposite sides of the valve housing 2. The respective volumes of pilot control compartments, or the pressures therein, are able to be changed by the respective pilot control piston 14, 16. The respective pilot control compartments 10, 12 are connected in a fluid-conducting manner to the rear sides or free end faces of the valve piston or main piston 4.

The two pilot control compartments 10, 12 can be pressurized with the pressure connection P via a fluid-conducting connection 18, formed as a longitudinal bore or channel in the main piston 4, with the control pressure or pump pressure of a pressure supply source, for example, in the form of a hydraulic pump. The pressure supply source is not shown in detail. For this purpose, the longitudinal channel 18 opens into a transverse channel 21, which penetrates the main piston 4 on both sides and opens into the annular space in the valve housing 2 connected to the pressure supply source via the pressure supply P. In an actuated state, as is depicted in an exemplary manner in FIG. 3 and as will be described in greater detail, of the respective pilot control piston, in this case the pilot control piston 14, the main piston 4 follows the movement of the pilot control piston 14, with the enabled, fluid-conducting connection between the assigned pilot control compartment 10 of this pilot control piston 14 and the assignable tank connection T1 being maintained for the flow of pilot control oil.

Figure 2:
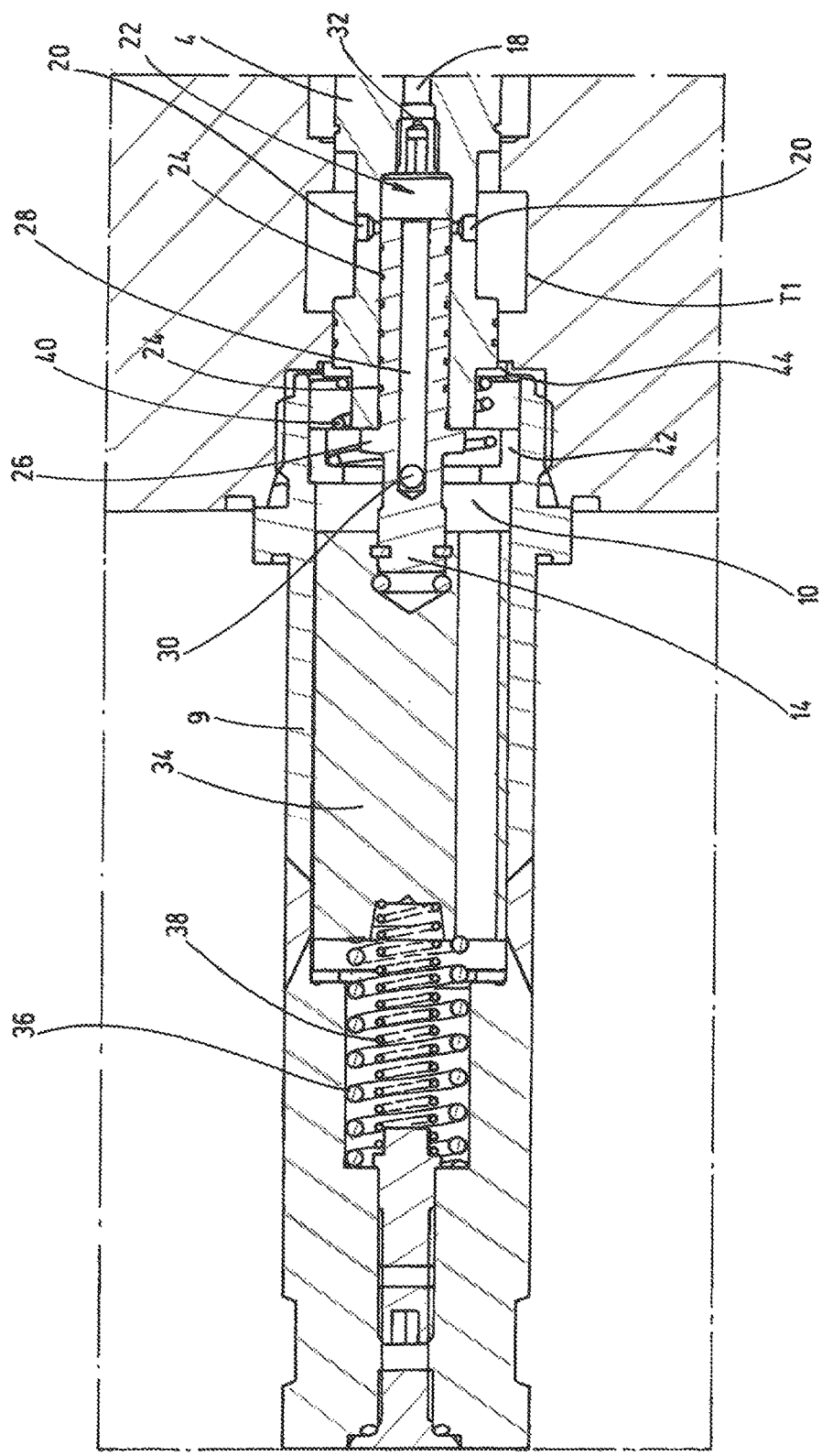
FIG. 2 is a magnified or enlarged partial side view in section of the valve device according to FIG. 1.

In particular, the respective fluid-conducting connection between the pilot control compartment, in this case, the pilot control compartment 10, of the respective pilot control piston, in this case, the pilot control piston 14, and the assignable tank connection or return connection T1 can be enabled at least one pilot control orifice, preferably formed as two pilot control orifices 20 of the main piston 4. As is shown in FIGS. 1 and 2, the pilot control orifice 20 is in any case closed by the assigned pilot control piston 14 in the unactuated state of the pilot control piston 14 and of the main piston 4. The conditions described above also apply in the unactuated state of the system for the second pilot control compartment 12 together with the second pilot control piston 16 and the region of the main piston 4 at the appropriate location. In addition, the respective pilot control piston 14, 16 is guided with its outer circumference at least partially along the inner circumference of an assignable recess 22 (cf. FIG. 2) in the main piston 4, into which recess the respective pilot control orifice 20 opens. For this longitudinal guiding of the respective pilot control piston 14, 16 in the recess 20 in the main piston 4, the pilot control pistons have, on their outer circumference side and axially separated from one another, individual lubrication grooves and leakage grooves 24. Grooves 24 are appropriately filled with hydraulic medium, and seal the respective pilot control compartment 10, 12 relative to the fluid-conducting connection 18 in the form of a longitudinal channel in the main piston 4.

As can also be seen from FIGS. 1 and 2, the respective pilot control piston 14, 16 has a projecting contact collar 26 outside of the recess 20 in the main piston 4. On the contact collar 26, the main piston 4 can rest with its respective assignable free end face in one of its displacement positions, as is shown in FIG. 2. This contact occurs in particular in the neutral position of the piston 4 for both contact collars 26 of the pilot control pistons 14, 16. Furthermore, the respective pilot control piston 14, 16 is designed as a hollow piston, which establishes in each of its displacement positions a permanent fluid-conducting connection 28 from the pressure connection P to the pilot control compartment 10, 12 of this pilot control piston 14 or 16 and to this extent also on the assignable piston rear side of the main piston 4. The connection 28 is in turn formed as a longitudinal channel and, viewed in the direction of FIG. 2, it opens into the recess 22 on its right-hand side and, on the left-hand side, into a transverse channel section 30. Channel section 30 in turn opens at both sides into the assignable pilot control compartment 10 for the first pilot control piston 14.

In addition, an orifice 32 or throttle is connected in the permanent fluid-conducting connection between the pressure connection P and the interior space in the form of the recess 22 comprising the hollow piston as the respective pilot control piston 14, 16 (cf. FIG. 2). This permanent fluid-conducting connection then extends firstly from the pressure supply source via the pressure connection P in the valve housing 2 and the assigned annular space section towards the valve piston or main piston 4. From there, via the transverse channel 21 and the respective longitudinal channel 18, the orifice 32, parts of the interior space, or of the recess 22 and of the fluid-conducting connection 28 in the respective hollow pilot control piston and transitioning into the transverse channel section 30, the permanent fluid-conducting connection is established to the respective pilot control compartment 10, 12 and then to the respective assignable rear side of the main piston 4. As shown in FIG. 1, this permanent fluid-conducting connection applies to both the left-hand pilot control compartment 10 and to the right-hand pilot control compartment 12.

The respective pilot control piston 14, 16 is connected on its side facing away from the connecting channel or longitudinal channel 18 in the main piston 4 to a keeper 34 of the respective magnet actuating system 6, 8 in a conventional manner via a snap ring connection or the like, and can be moved via the keeper 34 in a correspondingly guided manner in the recess 22 of the main piston in the longitudinal direction of the valve arrangement. The electrically energizable coil windings of the respective magnet actuating system 6, 8 were omitted from the drawings for the sake of simpler representation. Such a construction is, however, extremely common, so that it will not be discussed in further detail here. If, however, a magnet actuating system 6 or 8 is energized, the respective keeper 34 moves, viewed in the viewing direction of FIG. 1, to the left or the right (pulling magnet), with the respective other keeper 34 then travelling along with it due to the spring force of an adjusting spring 38 which is described below.

The keeper 34 is held in a position, as depicted in an exemplary manner in FIGS. 1 and 2, by the action of the adjusting spring 38, which pushes the keeper 34 back, in which position the main piston 4 abuts the contact shoulder or collar 26 of the respective pilot control piston 14, 16 due to the action of the adjusting spring 38. A main spring 36 is not tensioned in this position. The adjusting spring 38, designed as a compression spring, is accommodated in the main spring 36. The free travel of the respective keeper 34 can also be adjusted by the main spring 36. Furthermore, a resetting spring 40 is also provided as a final energy storage device on each side of the valve arrangement, which resetting spring is supported with its free end via a contact pot 42 on a shoulder of the housing pole tube arrangement 9 and with its other end on a contact plate 44. The control plate 44 is supported with its free projecting edge perimeter on an inwardly-projecting annular collar of the valve housing 2. The plate 44 itself forms a contact surface for a projecting annular shoulder of the valve piston or main piston 4 in this region, so that, as shown in an exemplary manner in FIG. 2, in a displacement movement of the main piston 4 out of its neutral position shown in FIG. 2 towards the left, the contact plate 44 lifts from the annular collar of the valve housing 2. With increasing pressure from the resetting spring 40, which is compressed correspondingly, the main piston 4 then moves to the left.

Figure 3:
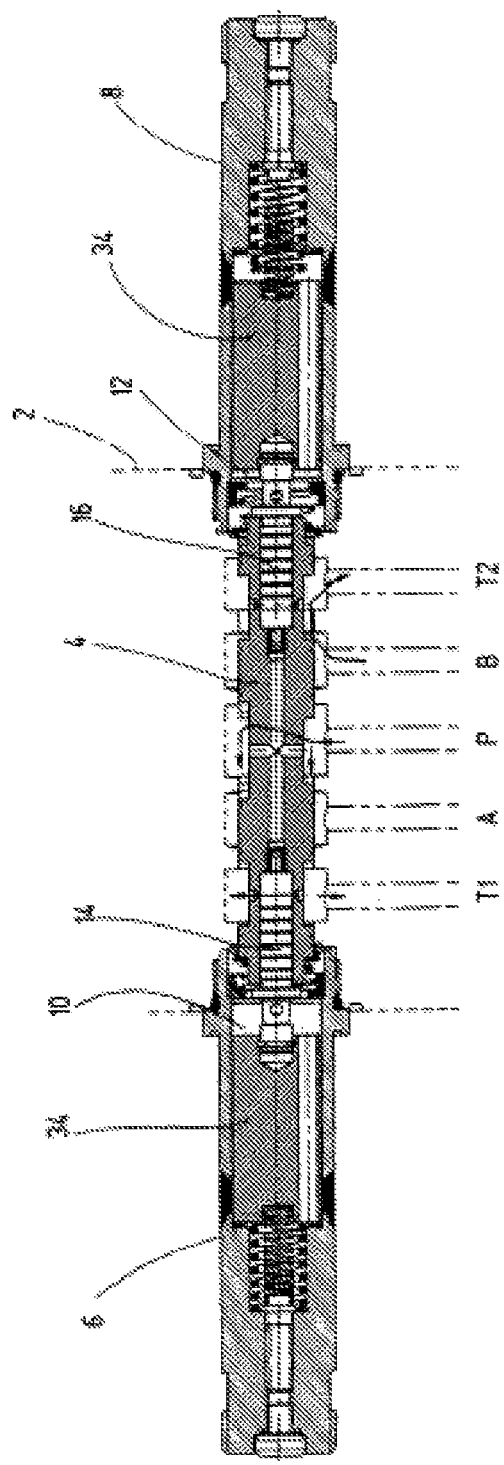
FIG. 3 is a side view in section of the valve device of FIG. 1, in which, viewed in the direction of FIG. 3, the magnet actuating system depicted on the left-hand side is energized.

The respective keeper 34 has a through-hole, so that in front of and behind the keeper 34 a pressure compensation is produced in the assignable displacement spaces inside the respective pole tube arrangement. Such a construction is likewise conventional such that it will not be discussed in further detail here. As shown in FIGS. 1 and 3 in particular, all significant components of the valve device arrangement are constructed in a modular manner as an identical parts concept or have identical symmetry axes.

The functioning of the valve device according to the invention shall be explained in detail below with reference to the drawing of FIG. 3, wherein the valve housing 2 is, for the sake of simpler representation, only partially depicted with its side outer walls being indicated by dashed lines and also with its fluid connections A, B, P, T1 and T2. Otherwise, the statements made above also apply with respect to the actuated embodiment according to FIG. 3.

Pilot controlled directional valves, as described above, have the advantage compared with directly-controlled valves that they are independent of the magnetic forces and spring forces with respect to the actuating force or resetting force. An improvement in performance with simultaneous reduction in the design size is possible when pilot control is realized according to this principle. The reduction in design size is equivalent to a decrease by a nominal size. It is then possible to use smaller and more cost-efficient magnets of the actuating system that have a lesser capacity, which results in a reduction or optimization of energy consumption. In the de-energized state as shown in FIGS. 1 and 2, the directional valve is in the depicted neutral position. If the magnet actuating system 6 is now energized, i.e., if the not depicted coil winding of the operating coil has an electric current or a voltage applied to it, a magnetic force is produced at the left keeper 34, which counteracts the force of the main spring 36 and which results in the first pilot control piston 14 together with the keeper 34 moving to the left as viewed in the direction of the figures. This movement enables an opening cross section in the form of the two pilot control orifices 20 arranged in the main piston 4. By this opening cross section, pilot control oil then flows to the tank via the tank connection or return connection T1, which causes a reduction in the pressure in the pilot control chamber, that is to say, in the first pilot control compartment 10. This pressure reduction allows the main piston 4 to follow the pilot control piston 14, with the pilot control orifice 20 not being closed, so that pilot control oil flows to connection T1.

The pressure in the second pilot control chamber, or pilot control compartment 12, then remains at the supply pressure level P, which produces an imbalance of forces over the opposite end faces of the main piston 4. This pressure imbalance results in a force in the direction of the actuating magnet system 6. The main piston 4 meanwhile enables the connections between pressure supply P and consumer connection A and between consumer connection B and tank connection or return connection T2. In the pole tube arrangement 9 of the additional magnet actuating system 8, the associated second pilot control piston 16 is pressed by the adjusting spring 38 during the movement of the main piston 4 to the left on the associated stop by the contact collar 26 in order to prevent an opening of the associated drain orifices 20. Any disruptive influence on the main piston 4 caused by friction forces or flow forces is compensated for in that more pilot control oil flows, which results in a reduction in pressure in the respective pilot control chamber or pilot control compartment 10, 12 and an increased imbalance of forces. If the electric current or the electric voltage is reduced, the main piston 4 moves from its travelled position depicted in FIG. 3 and returns to its starting position according to FIGS. 1 and 2.

If a reversal of the movement direction is desired, the magnet actuating system 8 is energized, and the same procedure as described above is then produced, but in this case the connection of the pressure connection P with the consumer connection B and the connection of the consumer connection A with the tank connection or return connection T1 are established. For the sake of completeness, FIG. 3 shows by arrows the fluid flow from the pressure supply P to the consumer connection A, as well as the return from the consumer connection B leading to the tank connection T2 for the travelled state of the main piston 4 towards the left. The figure also depicts at the tank connection or return connection T1 the fluid flow via the pilot control orifices 20 coming from the pressure supply P, to the extent that the hollow piston, formed as a control slide, of the first pilot control piston 14 enables these orifices 20, which can be closed again to the extent that the main piston 4 with its pilot control orifices 20 in this region "drives against" the outer circumference side of the first pilot control piston 14 in a movement to the left. The supply pressure for the respective pilot control can come either from a pressure supply device, for example in the form of a hydraulic pump, or it can be obtained from the respective consumer connection A, B. Furthermore, the respective highest pilot control pressure can be provided via shuttle valves or check valves. The design of solutions supplemented to this effect is shown in the prior art, for example for a pilot controlled valve as described in the publication DE 10 2010 005 229 A1. In the case of a current interruption of the magnet actuating systems 6, 8, the main piston 4 returns, by the springs 36, 38, to its spring-centered starting position or central position according to FIGS. 1 and 2.

While one embodiment has been chosen to illustrate the invention, it will be understood by those skilled in the art that various changes and modifications can be made therein without departing from the scope of the invention as defined in the claims.

The invention claimed is:

1. A valve device, comprising:
a valve housing having a piston bore, first and second consumer connections, a pressure connection and a tank connection;
a main piston axially displacable in said piston bore of said valve housing selectively connecting each of said first and second consumer connections to said pressure connection and said tank connection;
first and second magnet actuators coupled to said main piston displacing said main piston from a central position in a first axial direction connecting said first consumer connection to said pressure connection and connecting said second consumer connection to said tank connection and in a second axial direction opposite the first direction connecting said second consumer connection to said pressure connection and said first consumer connection to said tank connection;
a first pilot control compartment at and applying pressure to a first piston rear side of said main piston and being connected in fluid communication to said pressure connection;
a second pilot control compartment at and applying pressure to a second piston rear side of said main piston and being connected in fluid communication to said pressure connection; and
first and second pilot control pistons in said first and second pilot control compartments, respectively, and selectively enabling and blocking fluid communication between the respective first and second control compartments and said tank connection, said main piston following movement of the respective pilot control piston upon energizing of the respective magnet actuator due to a force applied to said main piston and activating a fluid communication connection between the respective pilot control compartment and said tank connection such that oil flows from the respective pilot control compartment to said tank connection, each of said first and second pilot control pistons being hollow forming a passage providing a permanent fluid communication connection between said pressure connection and the respective pilot control compartment on the respective piston rear side of said main piston.

2. A valve device according to claim 1 wherein
first and second pilot control orifices extend in said main piston providing fluid communication connections between said first and second pilot control compartments, respectively, and said tank connection, said first and control orifices being closed by said first and second pilot control pistons, respectively, when said first and second magnet actuators are unenergized, respectively.

3. A valve device according to claim 2 wherein
said first control piston is guided by an outer circumference thereof along an inner circumference of a first recess in said main piston, said first control orifice opening into said first control recess.

4. A device according to claim 3 wherein
said first pilot control piston comprises a projecting first collar located outside of said recess in said main piston, a free end face of said main piston engaging said first collar in at least one displacement position of said main piston.

5. A valve device according to claim 1 wherein
a throttle is in said passage in each of said first and second pilot control pistons providing the permanent fluid communication thereof.

6. A valve device according to claim 1 wherein
each of said first and second pilot pistons is actuatable by a keeper of the respective magnet actuator and is guided and slidable inside a respective interior space of said main piston.

7. A valve device according to claim 6 wherein
an adjusting spring applies an activation force on each said keeper of each of said first and second magnet actuators.

8. A valve device according to claim 1 wherein
each of said magnet actuators comprises a main spring and a resetting spring biasing said main piston into said central position, each said resetting spring surrounding the respective pilot control piston.

9. A valve device according to claim 1 wherein
each of said first and second magnet actuators comprise identical parts on opposite sides of said main piston;
each of said first and second pilot control compartments comprise identical parts on the opposite sides of said main piston; and
each of said first and second pilot control pistons comprise identical parts on the opposite sides of said main piston.

* * * * *